US012764489B2

(12) United States Patent
Wang

(10) Patent No.: US 12,764,489 B2
(45) Date of Patent: Oct. 13, 2026

(54) SPEAKER CONTROL METHOD AND APPARATUS, SPEAKER DEVICE, STEREO SPEAKER, AND STORAGE MEDIUM

(71) Applicant: GOERTEK INC., Weifang (CN)

(72) Inventor: Jiesong Wang, Weifang (CN)

(73) Assignee: GOERTEK INC., Weifang (CN)

( * ) Notice: Subject to any disclaimer, the term of this patent is extended or adjusted under 35 U.S.C. 154(b) by 162 days.

(21) Appl. No.: 18/857,554

(22) PCT Filed: Sep. 22, 2022

(86) PCT No.: PCT/CN2022/120424

§ 371 (c)(1),
(2) Date: Oct. 17, 2024

(87) PCT Pub. No.: WO2023/206941

PCT Pub. Date: Nov. 2, 2023

(65) Prior Publication Data

US 2025/0267421 A1 Aug. 21, 2025

(30) Foreign Application Priority Data

Apr. 29, 2022 (CN) ......................... 202210465680.9

(51) Int. Cl.
*H04S 7/00* (2006.01)
*H04R 5/02* (2006.01)

(52) U.S. Cl.
CPC ............... *H04S 7/303* (2013.01); *H04R 5/02* (2013.01); *H04S 2400/13* (2013.01)

(58) Field of Classification Search
CPC . H04R 1/02; H04R 1/323; H04R 5/02; H04R 2201/025; H04R 2430/01;
(Continued)

(56) References Cited

U.S. PATENT DOCUMENTS 9,693,169 B1 * 6/2017 Carlsson ................. G01S 15/89
10,567,871 B1 * 2/2020 Milne .................... H04R 1/403
(Continued)

FOREIGN PATENT DOCUMENTS

CN 102860041 A 1/2013
CN 104144370 A 11/2014
(Continued)

OTHER PUBLICATIONS

International Search Report from International Application No. PCT/CN2022/120424 mailed Jan. 18, 2023.

*Primary Examiner* — Jason R Kurr
(74) *Attorney, Agent, or Firm* — Shih IP Law Group, PLLC

(57) ABSTRACT

The present disclosure relates to the technical field of wireless communication technology, and discloses a speaker control method and apparatus, a speaker device, a stereo speaker, and a storage medium, capable of improving the listening effect of a user. The speaker control method includes: determining the current relative position of the speaker device and the target device carried by a user; determining user position change information according to the current relative position and a preset relative position; adjusting speaker parameters of the speaker device according to the user position change information, wherein the speaker parameters include speaker transducer orientation and/or playback volume; and playing an audio according to the speaker parameters. The present disclosure can adaptively adjust the speaker parameters, thereby reducing an influence of user movement on the listening effect.

10 Claims, 2 Drawing Sheets

(58) Field of Classification Search
CPC .......... H04S 7/303; H04S 7/302; H04S 7/304; H04S 2400/13
See application file for complete search history.

(56) References Cited

U.S. PATENT DOCUMENTS

| | | | | |
|---|---|---|---|---|
| 2005/0152565 | A1 | 7/2005 | Jouppi et al. | |
| 2013/0121515 | A1 | 5/2013 | Hooley et al. | |
| 2014/0328505 | A1 * | 11/2014 | Heinemann | G06F 3/012 381/303 |
| 2021/0306784 | A1 * | 9/2021 | Li | H04B 1/04 |
| 2022/0303680 | A1 * | 9/2022 | Ahmed | H04R 3/12 |
| 2023/0308827 | A1 * | 9/2023 | Shin | H04S 7/303 |

FOREIGN PATENT DOCUMENTS

| | | | |
|---|---|---|---|
| CN | 106325808 | A | 1/2017 |
| CN | 106817667 | A | 6/2017 |
| CN | 108347673 | A | 7/2018 |
| CN | 111757241 | A | 10/2020 |
| CN | 113055810 | A | 6/2021 |
| CN | 113645560 | A | 11/2021 |
| CN | 114268880 | A | 4/2022 |
| CN | 114679661 | A | 6/2022 |
| JP | 2006229738 | A | 8/2006 |

* cited by examiner

SPEAKER CONTROL METHOD AND APPARATUS, SPEAKER DEVICE, STEREO SPEAKER, AND STORAGE MEDIUM

The present application claims priority to Chinese Patent Application No. 202210465680.9, entitled "SPEAKER CONTROL METHOD AND APPARATUS, SPEAKER DEVICE, STEREO SPEAKER, AND STORAGE MEDIUM" filed with China Patent Office on Apr. 29, 2022, the entire contents of which are incorporated herein by reference.

TECHNICAL FIELD

The present disclosure relates to a technical field of wireless communication technology, and particularly, to a speaker control method and apparatus, a speaker device, a stereo speaker, and a storage medium.

DESCRIPTION OF RELATED ART

Speaker devices convert electrical signals into sound signals, and users can adjust the volume through buttons on the speaker device or through an application on a mobile phone. During actual use, a user may move in a region where the speaker device is located, and the listening effect will be different when the user is in different positions, so that the user needs to frequently adjust the volume or change a sound transmitting direction by rotating the speaker device, which results in a poor user experience.

Therefore, how to adaptively adjust parameters of speaker to reduce the impact of user movement on the listening effect is a technical problem that technical personnel in this field currently need to solve.

SUMMARY

An object of the present disclosure is to provide a speaker control method and apparatus, a speaker device, a stereo speaker, and a storage medium, which can adaptively adjust parameters of speaker to reduce the influence of user movement on the listening effect.

To solve the above technical problem, the present disclosure provides a speaker control method applied to a speaker device, including:

- determining the current relative position of a speaker device and a target device carried by a user;
- determining user position change information according to the current relative position and a preset relative position;
- adjusting speaker parameters of the speaker device according to the user position change information, wherein the speaker parameters include a speaker transducer orientation and/or playback volume; and playing an audio according to the speaker parameters.

Optionally, the speaker device is provided with a UWB base station, and the target device is provided with a UWB tag.

Determining the current relative position of the speaker device and the target device carried by the user includes:

- receiving a UWB signal generated from the UWB tag by the UWB base station, and determining the current relative position of the speaker device and the target device carried by the user according to the UWB signal.

Optionally, if the speaker parameters include the speaker transducer orientation, the adjusting the speaker parameters of the speaker device according to the user position change information includes:

- determining a change in direction according to the user position change information, and adjusting the speaker transducer orientation of the speaker device according to the change in direction, wherein the change in direction indicates a change in the user's orientation relative to the speaker device.

Optionally, if the speaker parameters include the playback volume, the adjusting the speaker parameters of the speaker device according to the user position change information includes:

- determining a change in distance according to the user position change information, and adjusting the playback volume of the speaker device according to the change in distance, wherein the change in distance indicates a change in the distance between the user and the speaker device.

Optionally, the method further includes: before the determining the user position change information according to the current relative position and the preset relative position,

- if a configuration instruction is received, setting a relative position of the speaker device and the target device when the configuration instruction is received as the preset relative position.

Optionally, determining the user position change information according to the current relative position and the preset relative position includes:

- determining position change information of the target device according to the current relative position and the preset relative position;
- determining an offset of the target device according to the type of the target device, wherein the offset of the target device indicates a position deviation between a midpoint of a line connecting the user's ears and the position of the target device; and
- determining the user position change information according to the position change information of the target device and the offset of the target device.

The present disclosure also provides a speaker control apparatus applied to a speaker device, including:

- a positioning module configured to determine the current relative position of the speaker device and the target device carried by the user;
- a position change determination module configured to determine user position change information according to the current relative position and the preset relative position;
- a parameter adjustment module configured to adjust speaker parameters of the speaker device according to the user position change information, wherein the speaker parameters include a speaker transducer orientation and/or playback volume; and
- a control module configured to playback an audio according to the speaker parameters.

The present disclosure also provides a speaker device, including a memory and a processor, wherein a computer program is stored on the memory, and the processor implements steps of the above-mentioned speaker control method when calling the computer program in the memory.

The present disclosure also provides a stereo speaker, including a left speaker device and a right speaker device, both of which include a memory and a processor, wherein a computer program is stored on the memory, and the processor implements steps of the above-mentioned speaker control method when calling the computer program in the memory.

The present disclosure also provides a storage medium, on which a computer program is stored, wherein when the computer program is executed, steps of the above-mentioned speaker control method are implemented.

The present disclosure provides a speaker control method applied to a speaker device, including: determining the current relative position of the speaker device and the target device carried by a user; determining user position change information according to the current relative position and a preset relative position; adjusting the speaker parameters of the speaker device according to the user position change information, wherein the speaker parameters include the speaker transducer orientation and/or playback volume; and playing an audio according to the speaker parameters.

According to the present disclosure, the current relative position of the speaker device and the target device carried by the user is firstly determined, and then a change in the user's position, i.e. user position change information can be determined according to the current relative position. In the present disclosure, speaker parameters of the speaker device are adjusted according to the user position change information, and then an audio is played back according to the speaker parameters. The present disclosure can adaptively adjust the speaker parameters according to the user's movement, thereby reducing an influence of user movement on the listening effect. In addition, the present disclosure also provides a speaker control apparatus, a speaker device, a stereo speaker and a storage medium, which have the above-mentioned beneficial effects and are not described in detail here.

BRIEF DESCRIPTION OF DRAWINGS

To more clearly illustrate the embodiments of the present disclosure, the drawings required to be used for the content of the embodiments will be briefly introduced in the following. Obviously, the drawings in the following description are merely some embodiments of the present disclosure, and for those of ordinary skill in the art, other drawings can also be obtained from the provided drawings without any creative effort.

DETAILED DESCRIPTIONS

To make the purpose, technical solutions and advantages of the embodiments of the present disclosure apparent, technical solutions of embodiments of the present disclosure will be clearly and completely described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

Figure 1:
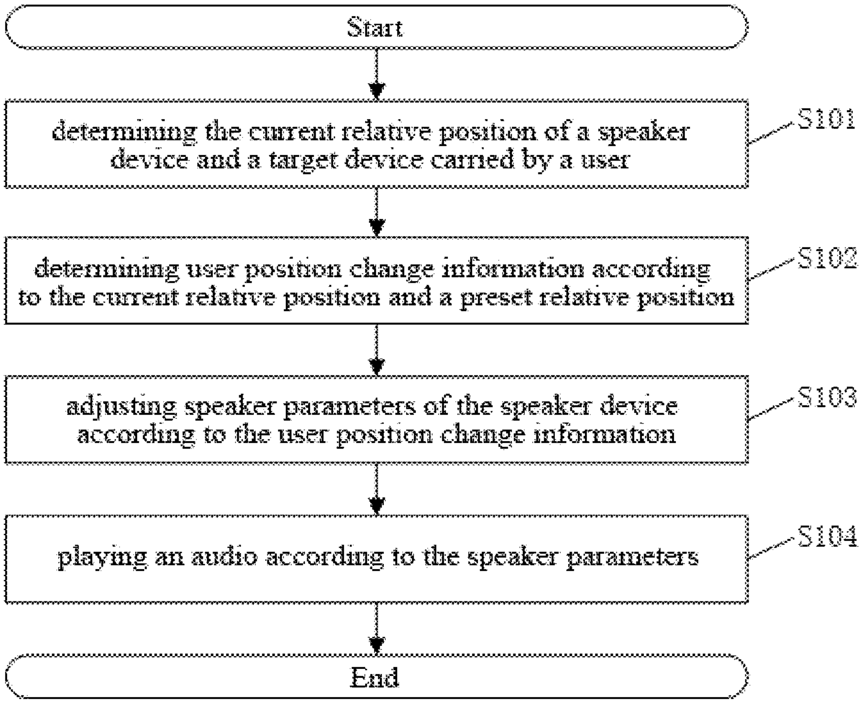
FIG. 1 is a flow chart of a speaker control method according to an embodiment of the present disclosure.

Referring to FIG. 1, FIG. 1 is a flow chart of a speaker control method according to an embodiment of the present disclosure.

The speaker control method according to an embodiment of the present disclosure may include may include:

S101: determining the current relative position of the speaker device and the target device carried by the user.

Here, the embodiment may be applied to a speaker device, and the type of the speaker device is not specifically limited herein. The speaker device may be provided with a wireless communication device (such as a Bluetooth module, a UWB base station), and determine the current relative position of itself and a target device carried by the user by using the wireless communication device. The target device carried by the user may be a Bluetooth earphone, a smart bracelet, a smart watch, a mobile phone, and other devices. The speaker device communicates and interacts with the target device to determine the current relative position of the speaker device and the target device.

S102: determining the user position change information according to the current relative position and the preset relative position.

Before performing this step, there may be an operation of setting a preset relative position. Here, the preset relative position is a preset relative position of the speaker device and the target device. As an alternative implementation, the preset relative position may be a relative position of the speaker device and the target device determined last time. As another alternative implementation, the preset relative position may be a position set by the user when configuring the speaker device. For example, in the embodiment, a configuration instruction may be received before the determining the user position change information according to the current relative position and the preset relative position, and a relative position of the speaker device and the target device when receiving the configuration instruction may be set as the preset relative position.

The current relative position and the preset relative position may be compared to determine the position change information of the target device, and then the user position change information may be obtained. In this embodiment, the position change information of the target device may also be directly used as the user position change information. The above-mentioned user position change information may include a change in distance and a change in direction. For example, the change in distance may be: an increasement of 2 meters; the change in direction may be: a rotation by 30 degrees clockwise.

S103: adjusting the speaker parameters of the speaker device according to the user position change information.

When the user position changes, the listening effect may also be changed. After obtaining the user position change information, the speaker parameters of the speaker device can be adjusted based on the user position change information.

Specifically, the volume heard by the user will change when a distance between the speaker device and the target device changes, and accordingly, when the user position change information includes the change in distance and the change in distance is not 0, the adjusted speaker parameters include the playback volume (i.e., sound volume).

Also, when the direction between the speaker device and the target device changes, the audio orientation heard by the user will change, and accordingly, when the user position change information includes the change in direction and the change in direction is not 0, the adjusted speaker parameters include the speaker transducer orientation (i.e., sound transmission direction).

S104: playing an audio according to the speaker parameters.

After the speaker parameters are adjusted, the audio can be played back according to the adjusted speaker parameters. Specifically, if the speaker parameters include the playback volume, the audio may be played back according to the adjusted playback volume; if the speaker parameters include the speaker transducer orientation, the speaker transducer of the speaker device may be driven by a motor to rotate to a corresponding direction.

In the embodiment, the current relative position of the speaker device and the target device carried by the user is first determined, and the change of the user's position, that is, the user position change information, can be determined according to the current relative position. Further, in the embodiment, the speaker parameters are adjusted according to the user position change information, and then the audio can be played back according to the adjusted speaker parameters. The embodiment can adaptively adjust the speaker parameters according to the user's movement, thereby reducing an influence of user's movement on the listening effect.

As a further introduction to the embodiment corresponding to FIG. 1, the above-mentioned speaker device may be provided with a UWB (Ultra-Wide Band) base station therein, and the target device is provided with a UWB tag. The speaker device can use the UWB base station to receive a UWB signal generated from the UWB tag, and determine the current relative position of the speaker device and the target device carried by the user according to the UWB signal.

As an alternative implementation, the target device is carried by the user, and the user position change information can be obtained by converting on the position relationship between the target device and the user. The specific processes are as follows: determining position change information of the target device according to the current relative position of the speaker device and the target device and the preset relative position; determining an offset of the target device according to the type of the target device, wherein the offset of the target device indicates a position deviation between a midpoint of the line connecting the user's ears and the position of the target device; and determining the user position change information according to the position change information of the target device and the offset of the target device. Specifically, different types have different offsets, for example, the offset of a smart bracelet is a displacement deviation between the user's wrist and the midpoint of the line connecting the user's ears, for another example, the offset of a smart phone is a displacement deviation between the user's clothes pocket and the midpoint of the line connecting the user's ears, and for another example, the offset of AR glasses is a displacement deviation between the center of the eyeglass bridge and the midpoint of the line connecting the user's ears.

As a further introduction to the embodiment corresponding to FIG. 1, if the speaker parameters include the speaker transducer orientation, the speaker transducer orientation in the speaker parameters can be adjusted as follows: determining a change in direction according to the user position change information, and adjusting the speaker transducer orientation of the speaker device according to the change in direction, wherein the change in direction indicates a change in the user's orientation relative to the speaker device. Through the above method, an angle between the speaker transducer orientation of the speaker device and the user direction (i.e., the connection direction between the speaker device and the user) may be reduced, thereby ensuring that the angle between the speaker transducer orientation and the user direction is less than a preset angle (such as 5 degrees). As an alternative implementation, it can also be implemented by adjusting the speaker transducer orientation of the speaker device according to the change in direction so that the audio transmitting direction of the speaker device relative to the user does not change. For example, the user is in a direction of 60 degrees clockwise relative to the speaker device, that is, the change in direction is 60 degrees clockwise, and at this time, the speaker transducer orientation of the speaker device can be controlled to rotate 60 degrees clockwise.

As a further introduction to the embodiment corresponding to FIG. 1, if the speaker parameters include the playback volume, the playback volume of the speaker device can be adjusted as follows: determining the change in distance according to the user position change information, and adjusting the playback volume of the speaker device according to the change in distance, wherein the change in distance indicates a change in the distance between the user and the speaker device. The playback volume of the speaker device is positively correlated with the change in distance, and the above method can basically keep the user's listening experience of the audio unchanged. For example, an audio decibel number heard by the user is used to represent the user's listening experience, through the above method, a difference between the audio decibel numbers heard by the user before and after the user's movement may be less than a preset decibel (such as 1 decibel). When the change in distance is greater than 0, the distance between the user and the speaker device increases, and the playback volume of the speaker device can be increased; when the change in distance is less than 0, the distance between the user and the speaker device decreases, and the playback volume of the speaker device can be reduced, As an alternative implementation, the embodiment can set an one-to-one correspondence between the playback volume and the change in distance, and adjust the playback volume of the speaker device in real time based on the one-to-one correspondence between the playback volume and the change in distance, so that the user's listening experience of the audio remains unchanged.

In the embodiment, by using the UWB positioning technology, the UWB base station and the UWB tag update the change in relative position in real time, obtain the relative position relationship between the user and the two speaker devices, and adjust the playback volume and speaker transducer orientation of the two speaker devices at this time, so that the user can always maintain a good listening experience. When a user wants to experience a better stereo effect, he or she does not need to adjust the placement of the speaker and the position for enjoying music, the speaker can be placed in an approximate position, and the user can enjoy a better stereo effect within a certain range.

The process described in the above embodiment is explained below through an exemplary embodiment.

Two or more speaker devices can be inter-connected to constitute a stereo speaker, so that a user can get a full range of stereo effects. Most of speaker devices in the related art can only transmits sound in one direction (that is, the speaker transducer orientation is fixed), and the user needs to rotate the speaker transducer orientation to the required direction after moving. In actual use of such stereo speakers, since the two speakers are at different distances from the user, which causes different perceptions of the human ear, the user experience is affected. In this case, to get a perfect experience, special arrangements on the position and angle of the speakers are required, which is relative difficult.

Figure 2:
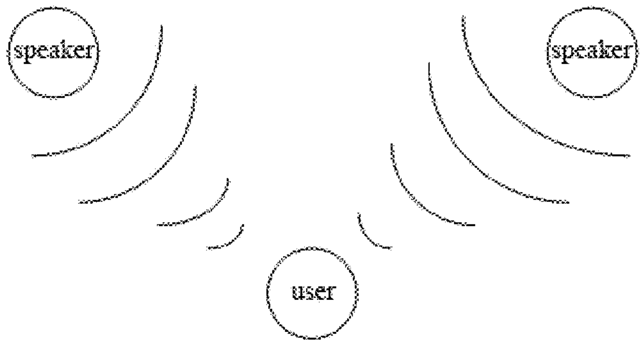
FIG. 2 is a schematic diagram of a normal sound experience effect.
Figure 3:
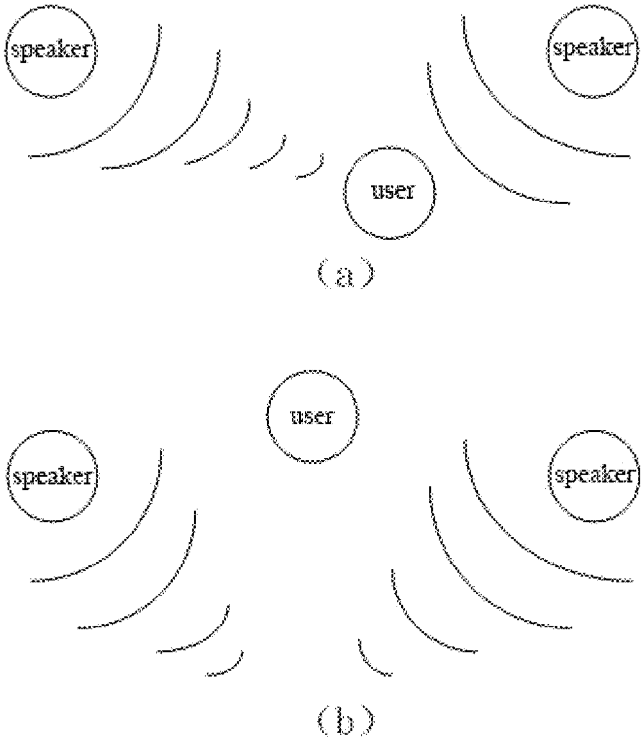
FIG. 3 is a schematic diagram of the sound experience effect after the user moves.

Referring to FIGS. 2 and 3, FIG. 2 is a schematic diagram of a normal sound experience effect, and FIG. 3 is a schematic diagram of the sound experience effect after the user moves. FIGS. 3(*a*) and 3(*b*) show the impact of two user movement methods on the sound experience effect. If the user moves, it will cause a difference in the sound intensity of the two speakers heard by the user, affecting the stereo experience. Or, walking in another direction of the speaker may also lead to a poorer listening experience.

To overcome the defects of the above-mentioned conventional stereo speakers, the present embodiment provides a stereo speaker including a UWB base station and a rotatable speaker transducer. Through the UWB positioning technology, the playback volume and speaker transducer orientation of the stereo speaker are adjusted so that people in different positions have a similar hearing experience, and there is no need to specially arrange the sound orientation of the speaker, thereby improving the experience. Specifically, in the embodiment, a UWB base station can be added to both speaker devices, and then after pairing the stereo speaker with a device such as a bracelet, a watch, a mobile phone, etc., the user's position can be accurately located by the UWB tag in the device such as the bracelet, the watch, the mobile phone, etc., thereby adjusting the speaker transducer orientation and playback volume of the two speaker devices in real time to maximize the stereo experience effect. When the user moves, the UWB base station and UWB tag will track and locate the user in real time, thereby adjusting the effect to ensure that the user's audio experience does not deteriorate while moving.

The two speaker devices adjust the playback volume of the current audio according to the distance between themselves and the user. For example, in order to ensure that the user has the same listening experience with the two speaker devices, the playback volume of the speaker device on one side (the speaker device that the user is moving close to it) can be lowered and the playback volume of the speaker device on the other side (the speaker device that user is moving away from it) can be increased, or only the playback volume of the speaker device on one side (the speaker device that the user is moving close to it) can be lowered, or only the playback volume of the speaker device on one side (the speaker device that user is moving away from it) can be increased. For example, assuming that the distance between the user and the left speaker is r1, and the distance between the user and the right speaker is r2, a difference in playback volume between the left and right speaker devices heard by the user is $\Delta I = I1 - I2 = 20\lg(r2/r1)$, where I1 is the playback volume of the left speaker device, and I2 is the playback volume of the right speaker device. To make the user have the same listening experience with the two speaker devices, the playback volume of the left speaker device can be adjusted to $I2 + 20\lg(R/r)$, or the sound decibel number of the right speaker device can be adjusted to $I1 - 20\lg(R/r)$. If the left speaker device and the right speaker device are adjusted at the same time, a sum of an absolute value of the change in playback volume of the left speaker device and an absolute value of the change in playback volume of the right speaker device is equal to $20\lg(r2/r1)$. Through the above method, a similar listening experience may be achieved when the sound reaches the human ear, and the listening experience may not be different due to different distances of the user from the two speaker devices.

In the embodiment, the speaker transducer of the speaker device can rotate, so that when the relative direction between the speaker device and the user is determined by using the UWB base station and the UWB tag, the speaker transducer is rotated according to a change in the relative direction to make the speaker transducer orientate towards the user's location, thereby enabling people to experience the stereo sound generated from the two speakers wherever they are.

Figure 4:
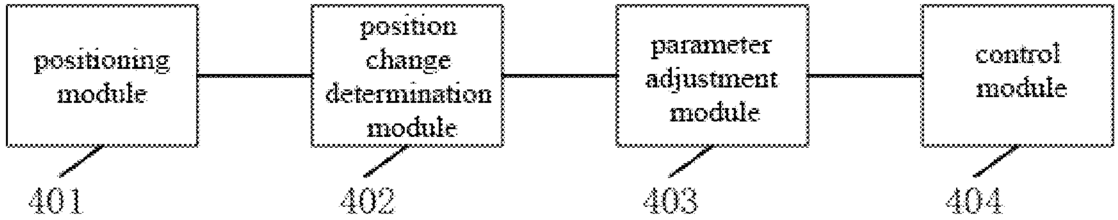
FIG. 4 is a structural schematic diagram of a speaker control apparatus according to an embodiment of the present disclosure.

Referring to FIG. 4, FIG. 4 is a structural schematic diagram of a speaker control apparatus according to an embodiment of the present disclosure, the speaker control apparatus may be applied to a speaker device, and includes:

- a positioning module 401 configured to determine the current relative position of the speaker device and the target device carried by the user;
- a position change determination module 402 configured to determine user position change information according to the current relative position and the preset relative position;
- a parameter adjustment module 403 configured to adjust speaker parameters of the speaker device according to the user position change information, wherein the speaker parameters include the speaker transducer orientation and/or playback volume; and
- a control module 404 configured to playback an audio according to the speaker parameters.

According to the present disclosure, the current relative position of the speaker device and the target device carried by the user is firstly determined, and a change in the user's position, i.e. user position change information can be determined according to the current relative position. In the present disclosure, speaker parameters of the speaker device are adjusted according to the user position change information, and then an audio is played back according to the speaker parameters. The present disclosure can adaptively adjust the speaker parameters according to the user's movement, thereby reducing an influence of user movement on the listening effect.

Furthermore, the speaker device is provided with a UWB base station, and the target device is provided with a UWB tag.

The positioning module 401 receives a UWB signal generated from the UWB tag by using the UWB base station, and determine the current relative position of the speaker device and the target device carried by the user according to the UWB signal.

Furthermore, if the speaker parameters include the speaker transducer orientation, the parameter adjustment module 403 determines a change in direction according to the user position change information, and adjust the speaker transducer orientation of the speaker device according to the change in direction, wherein the change in direction indicates a change in the user's orientation relative to the speaker device.

Furthermore, if the speaker parameters include the playback volume, the parameter adjustment module 403 determines a change in distance according to the user position change information, and adjust the playback volume of the speaker device according to the change in distance, wherein the change in distance indicates a change in the distance between the user and the speaker device.

Furthermore, the apparatus further includes:

- a position setting module configured that before the determining the user position change information according to the current relative position and the preset relative position, if a configuration instruction is received, setting a relative position of the speaker device and the target device when the configuration instruction is received as the preset relative position.

Furthermore, the position change determination module 402 determines position change information of the target device according to the current relative position and the preset relative position; determine an offset of the target device according to the type of the target device, wherein the offset of the target device indicates a position deviation between a midpoint of a line connecting the user's ears and the position of the target device; and determine the user position change information according to the position change information of the target device and the offset of the target device.

Since the embodiments of the apparatus correspond to the embodiments of the method, the embodiments of the apparatus can be referred to the description of the embodiments of the method, and it will not be repeated here.

The present disclosure also provides a storage medium, on which a computer program is stored, and wherein when the computer program is executed, steps of the above-mentioned speaker control method are implemented. Here, the storage medium may include: a USB flash drive, a mobile hard disk, a Read-Only Memory (ROM), a Random Access Memory (RAM), a magnetic disk, an optical disk, or other media that can store program codes.

The present disclosure also provides a speaker device, including a memory and a processor, wherein a computer program is stored on the memory, and the processor implements steps of the above-mentioned speaker control method when calling the computer program in the memory. Two or more of the above-mentioned speaker devices can be interconnected to produce a stereo speaker.

The present disclosure also provides a stereo speaker, including a left speaker device and a right speaker device, both of which include a memory and a processor, wherein a computer program is stored on the memory, and the processor implements steps of the above-mentioned speaker control method when calling the computer program in the memory.

The various embodiments in the present specification are described in a progressive manner, and each embodiment focuses on the differences from other embodiments, and the same and similar parts between the various embodiments can be referred to each other. As for the apparatus disclosed in the embodiments, since it corresponds to the method disclosed in the embodiments, the description is relatively simple. For relevant parts, please refer to the description of the method. For those skilled in the art, several improvements and modifications can be made to the present disclosure without departing from the principles of the disclosure, and these improvements and modifications also fall within the scope of protection of the claims of this application.

It should also be noted that in the specification, relational terms such as first and second described herein are only used to distinguish one entity or operation from another entity or operation, and do not necessarily require or imply any such actual relationship or order between these entities or operations. Moreover, terms such as "include", "include" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "including a . . . " does not preclude the presence of additional identical elements in the process, method, article or apparatus including the element.

What is claimed is:

1. A speaker control method applied to a speaker device, comprising:

determining the current relative position of a speaker device and a target device carried by a user;

determining user position change information according to the current relative position and a preset relative position;

adjusting speaker parameters of the speaker device according to the user position change information, wherein the speaker parameters comprise a speaker transducer orientation and/or playback volume; and playing an audio according to the speaker parameters.

2. The speaker control method of claim 1, wherein the speaker device is provided with an (ultrawideband base station) UWB base station, and the target device is provided with a UWB tag, and the determining the current relative position of the speaker device and the target device carried by the user comprises:

receiving a UWB signal generated from the UWB tag by the UWB base station, and determining the current relative position of the speaker device and the target device carried by the user according to the UWB signal.

3. The speaker control method of claim 1, wherein the adjusting the speaker parameters of the speaker device according to the user position change information comprises:

determining a change in direction according to the user position change information, and adjusting the speaker transducer orientation of the speaker device according to the change in direction, wherein the change in direction indicates a change in a user's orientation relative to the speaker device.

4. The speaker control method of claim 1, wherein the adjusting the speaker parameters of the speaker device according to the user position change information comprises:

determining a change in distance according to the user position change information, and adjusting the playback volume of the speaker device according to the change in distance, wherein the change in distance indicates a change in a distance between the user and the speaker device.

5. The speaker control method of claim 1, further comprising: before the determining the user position change information according to the current relative position and the preset relative position, if a configuration instruction is received, setting a relative position of the speaker device and the target device when the configuration instruction is received as the preset relative position.

6. The speaker control method of claim 1, wherein the determining the user position change information according to the current relative position and the preset relative position comprises:

determining position change information of the target device according to the current relative position and the preset relative position;

determining an offset of the target device according to a type of the target device, wherein the offset of the target device indicates a position deviation between a midpoint of a line connecting the user's ears and a position of the target device; and determining the user position change information according to the position change information of the target device and the offset of the target device.

7. A speaker device, comprising a memory and a processor, wherein a computer program is stored on the memory, and wherein the processor implements steps of the speaker control method of claim 1 when calling the computer program in the memory.

8. A stereo speaker, comprising a left speaker device and a right speaker device, both of which comprise a memory and a processor, wherein a computer program is stored on the memory, and wherein the processor implements steps of the speaker control method of claim 1 when calling the computer program in the memory.

9. A non-transitory storage medium, on which a computer program is stored, wherein when the computer program is executed, steps of the speaker control method of claim 1 are implemented.

10. A speaker control apparatus, applied to a speaker device, comprising:

a positioning module configured to determine the current relative position of a speaker device and a target device carried by a user;

a position change determination module configured to determine user position change information according to the current relative position and a preset relative position;

a parameter adjustment module configured to adjust speaker parameters of the speaker device according to the user position change information, wherein the speaker parameters comprise speaker a transducer orientation and/or playback volume; and a control module configured to playback an audio according to the speaker parameters.

* * * * *